(12) United States Patent
Matsuoka et al.

(10) Patent No.: US 9,077,201 B2
(45) Date of Patent: Jul. 7, 2015

(54) UNINTERRUPTIBLE POWER SUPPLY DEVICE

(75) Inventors: Kazumasa Matsuoka, Minato-ku (JP); Katsumi Ikeda, Chiyoda-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 180 days.

(21) Appl. No.: 13/257,986

(22) PCT Filed: May 29, 2009

(86) PCT No.: PCT/JP2009/059868
§ 371 (c)(1),
(2), (4) Date: Sep. 21, 2011

(87) PCT Pub. No.: WO2010/137163
PCT Pub. Date: Dec. 2, 2010

(65) Prior Publication Data
US 2012/0019070 A1    Jan. 26, 2012

(51) Int. Cl.
*H02J 9/06*      (2006.01)
*G06F 1/30*      (2006.01)

(52) U.S. Cl.
CPC .. *H02J 9/062* (2013.01); *G06F 1/30* (2013.01)

(58) Field of Classification Search
USPC .......................................................... 307/64
See application file for complete search history.

(56) References Cited

U.S. PATENT DOCUMENTS

| | | | |
|---|---|---|---|
| 6,487,096 B1 * | 11/2002 | Gilbreth et al. | 363/35 |
| 7,426,103 B2 * | 9/2008 | Nozu et al. | 361/502 |
| 7,583,910 B2 * | 9/2009 | Matsumoto et al. | 399/69 |
| 7,755,340 B2 * | 7/2010 | Karasawa et al. | 323/282 |
| 8,084,874 B2 * | 12/2011 | Llorente Gonzalez | 290/44 |
| 2002/0017822 A1 | 2/2002 | Umemura et al. | |
| 2003/0080622 A1 * | 5/2003 | Koenig | 307/64 |
| 2010/0146333 A1 * | 6/2010 | Yong et al. | 714/14 |
| 2010/0157638 A1 * | 6/2010 | Naiknaware et al. | 363/131 |
| 2011/0100760 A1 * | 5/2011 | Acquaviva | 187/290 |

FOREIGN PATENT DOCUMENTS

| | | |
|---|---|---|
| CN | 1934774 A | 3/2007 |
| JP | 62 193515 | 8/1987 |
| JP | 62 293943 | 12/1987 |
| JP | 7-39088 A | 2/1995 |

(Continued)

OTHER PUBLICATIONS

International Search Report issued Aug. 18, 2009 in PCT/JP09/059868 filed May 29, 2009.

(Continued)

*Primary Examiner* — Rexford Barnie
*Assistant Examiner* — Daniel Kessie
(74) *Attorney, Agent, or Firm* — Oblon, McClelland, Maier & Neustadt, L.L.P.

(57) ABSTRACT

An uninterruptible power supply device including a rectifier circuit rectifying output power of an inverter. At a first startup of the inverter, output power of the rectifier circuit is supplied to an electric double-layer capacitor. At second and subsequent startups of the inverter, output power of one of a converter and the rectifier circuit is selectively supplied to the electric double-layer capacitor. Therefore, by controlling the inverter, the electric double-layer capacitor can be precharged easily with a simple configuration.

14 Claims, 7 Drawing Sheets

(56) References Cited

FOREIGN PATENT DOCUMENTS

| | | |
|---|---|---|
| JP | 9-308135 A | 11/1997 |
| JP | 2000-152519 A | 5/2000 |
| JP | 2001 61238 | 3/2001 |
| JP | 2002-34179 A | 1/2002 |
| JP | 2002-176736 A | 6/2002 |
| JP | 2003-79161 A | 3/2003 |
| JP | 2004-15919 A | 1/2004 |
| JP | 2004-48964 A | 2/2004 |
| JP | 2004 72973 | 3/2004 |
| JP | 2006-60963 A | 3/2006 |
| JP | 2006-74903 A | 3/2006 |
| JP | 2006 246609 | 9/2006 |
| JP | 2007-028783 A | 2/2007 |

OTHER PUBLICATIONS

Office Action issued Dec. 18, 2012 in Japanese Patent Application No. 2011-515818 with English language translation.

Office Action issued Aug. 28, 2013, in Taiwanese Patent Application No. 098138590, filed Nov. 13, 2009 (with English-language translation).

Combined Office Action and Search Report issued Aug. 1, 2013 in Chinese Patent Application No. 200980159599.0 (with partial English translation and English Translation of Category of Cited Documents).

* cited by examiner

FIG.1 BYPASS FEED MODE

FIG.3 EDLC PRECHARGE MODE

FIG.4 EDLC CHARGE MODE

INVERTER FEED MODE

TIME t (sec)

UNINTERRUPTIBLE POWER SUPPLY DEVICE

TECHNICAL FIELD

The present invention relates to an uninterruptible power supply device, and particularly to an uninterruptible power supply device with an electric double-layer capacitor used as a power storage device.

BACKGROUND ART

Conventionally, an uninterruptible power supply device is widely used as a power supply device for stably supplying ac power to a fundamental load such as a computer system. As shown in, for example, Japanese Patent Laying-Open No. 2001-61238 (Patent Literature 1), an uninterruptible power supply device generally includes a converter converting ac power into dc power, an inverter converting dc power into ac power, and a power storage device storing dc power. In a normal state, the converter converts ac power from a commercial ac power supply into dc power, and supplies dc power to the inverter while charging the power storage device. The inverter converts dc power into ac power for supply to a load. In the case of a power interruption of the commercial ac power supply, electric power is supplied from the power storage device to the inverter, so that the inverter continues supplying ac power to the load.

CITATION LIST

Patent Literature

PTL 1: Japanese Patent Laying-Open No. 2001-61238

SUMMARY OF INVENTION

Technical Problem

As a power storage device, an electric double-layer capacitor, a storage battery or the like is used. The electric double-layer capacitor is superior to the storage battery in the viewpoint of environmental protection and lifetime. However, when a power interruption time is long, the electric double-layer capacitor is discharged to 0V unlike the storage battery. Therefore, in the case of using the electric double-layer capacitor, the electric double-layer capacitor is not only subjected to normal charging by a converter, but also needs to be precharged from 0V to a predetermined voltage at the startup of the device or when a long power interruption occurs.

A possible method of performing precharge is to provide a bidirectional chopper circuit between the converter and the electric double-layer capacitor, and control the bidirectional chopper circuit so that a current flowing from the converter to the electric double-layer capacitor is gradually increased. However, this method disadvantageously results in increased device size and complicated device configuration.

It is therefore a main object of the present invention is to provide an uninterruptible power supply device capable of easily precharging an electric double-layer capacitor with a simple configuration.

Solution to Problem

An uninterruptible power supply device according to the present invention includes a converter, an electric double-layer capacitor, an inverter, a rectifier circuit, and a charging circuit. The converter converts first ac power from a commercial ac power supply into dc power. The electric double-layer capacitor stores the dc power. The inverter converts the dc power from the converter and the electric double-layer capacitor into second ac power. The rectifier circuit converts the second ac power into dc power. The charging circuit supplies output power of the rectifier circuit to the electric double-layer capacitor at a first startup of the inverter, and selectively supplies output power of one of the converter and the rectifier circuit to the electric double-layer capacitor at second and subsequent startups of the inverter.

Advantageous Effects of Invention

In the uninterruptible power supply device according to the present invention, the rectifier circuit converting output power of the inverter into dc power is provided, and output power of the rectifier circuit is supplied to the electric double-layer capacitor at a first startup of the inverter, and output power of one of the converter and the rectifier circuit is selectively supplied to the electric double-layer capacitor at second and subsequent startups of the inverter. Therefore, by controlling the inverter, the electric double-layer capacitor can be precharged easily with a simple configuration.

DESCRIPTION OF EMBODIMENTS

Figure 1:
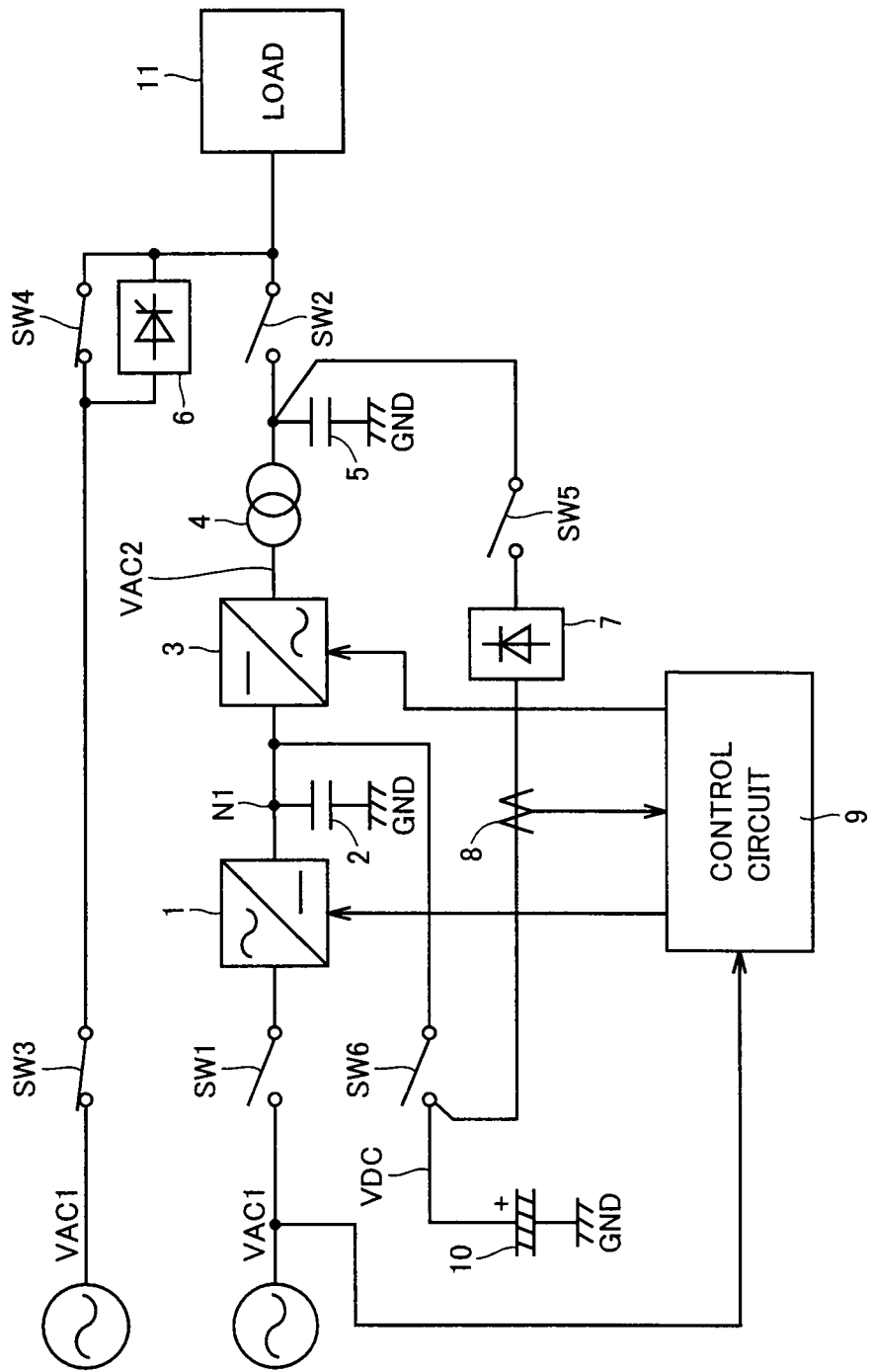
FIG. 1 is a circuit block diagram showing a configuration of an uninterruptible power supply device and a bypass feed mode according to an embodiment of the present invention.

An uninterruptible power supply device according to an embodiment of the present invention includes switches SW1 to SW6, a converter 1, capacitors 2, 5, an inverter 3, a transformer 4, an STS 6, a rectifier circuit 7, a current detection circuit 8, a control circuit 9, and an electric double-layer capacitor 10, as shown in FIG. 1.

One terminal of switch SW1 receives an ac voltage VAC1 from a commercial ac power supply, and the other terminal is connected to converter 1. Switch SW1 is controlled by control circuit 9 to become conducting when the uninterruptible power supply device is powered on. Converter 1 is controlled by control circuit 9 to convert ac voltage VAC1 supplied from the commercial ac power supply through switch SW1 into a dc voltage for output to a power supply node N1. Capacitor 2 is connected between power supply node N1 and a line of a reference voltage GND to smooth the voltage at power supply node N1.

Inverter 3 is controlled by control circuit 9 to convert the dc voltage at power supply node N1 into an ac voltage VAC2 of commercial frequencies. Transformer 4 transmits output voltage VAC2 of inverter 3 to one terminal of switch SW2. Capacitor 5 is connected between an output node of transformer 4 and a line of reference voltage GND. Transformer 4 and capacitor 4 constitute an output filter for removing noise occurring in inverter 3 or the like.

The other terminal of switch SW2 is connected to an essential load 11 such as a computer system. Switch SW2 is controlled by control circuit 9 to become conducting in an inverter feed mode of supplying output voltage VAC2 of inverter 3 to load 11, and to become nonconducting in a bypass feed mode of supplying ac voltage VAC1 received from the commercial ac power supply to load 11 through switches SW3 and SW4 for bypass.

One terminal of switch SW3 receives ac voltage VAC1 from the commercial ac power supply, and the other terminal is connected to load 11 through switch SW4. Switch SW3 is brought into a conducting state when the uninterruptible power supply device is used. Switch SW4 is controlled by control circuit 9 to become nonconducting in the inverter feed mode and to become conducting in the bypass feed mode. STS 6 is connected in parallel to switch SW4. STS 6 is controlled by control circuit 9 to become conducting when inverter 3 fails in the inverter feed mode to instantaneously supply ac power VAC1 received from the commercial ac power supply to load 11.

One terminal of switch SW5 is connected to the output node of transformer 4, and the other terminal is connected to an input node of rectifier circuit 7. Switch SW5 is controlled by control circuit 9 to become conducting in an EDLC (Electric Double-Layer Capacitor) precharge mode of precharging electric double-layer capacitor 10, and to become nonconducting during the remaining period.

In the EDLC precharge mode, rectifier circuit 7 rectifies ac voltage VAC2 supplied through switch SW5 to generate a dc voltage. Electric double-layer capacitor 10 has its positive electrode connected to an output node 10 of rectifier circuit 7, and its negative electrode connected to a line of reference voltage GND. Electric double-layer capacitor 10 stores dc power.

Switch SW6 is connected between the positive electrode of electric double-layer capacitor 10 and power supply node N1. Switch SW6 is controlled by control circuit 9 to become nonconducting in the EDLC precharge mode, and to become conducting during the remaining period.

Current detection circuit 8 detects a dc current flowing from rectifier circuit 7 to electric double-layer capacitor 10 to supply a signal indicative of a detected value to control circuit 9. Control circuit 9 controls the whole uninterruptible power supply device based on ac voltage VAC1 received from the commercial ac power supply and the output signal of current detection circuit 8.

Figure 2:
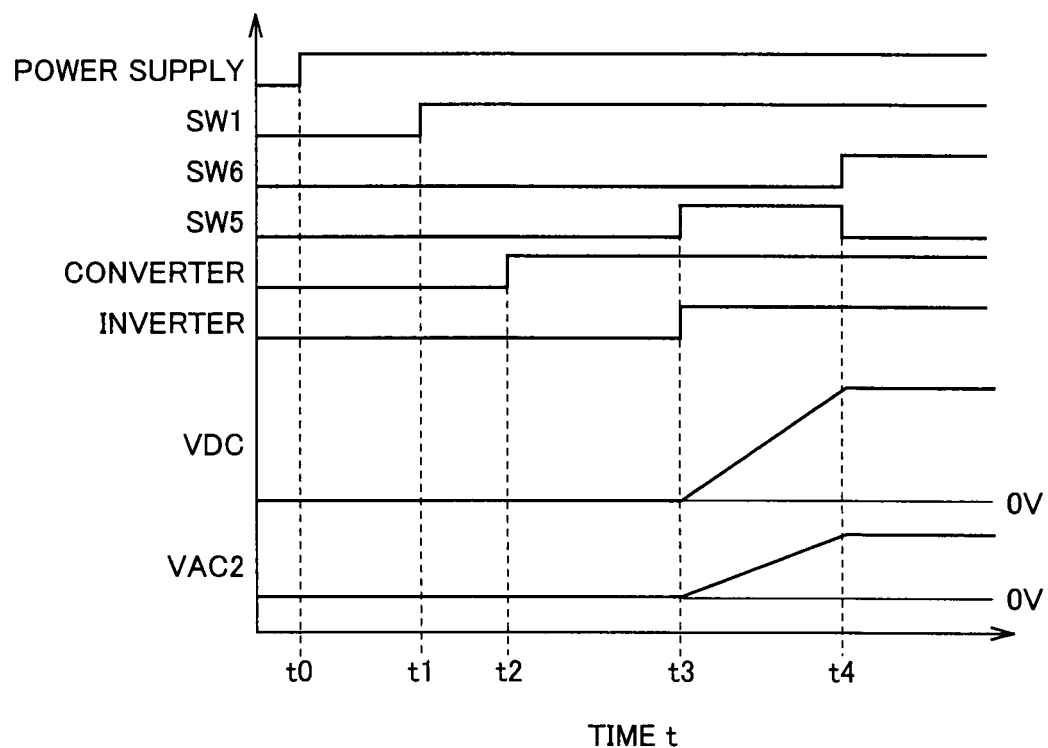
FIG. 2 is a timing chart showing an operation at a startup of the uninterruptible power supply device shown in FIG. 1.

An operation of this uninterruptible power supply device will now be described. FIG. 2 is a timing chart showing an operation at a first startup of inverter 3. In the initial state, as shown in FIG. 1, switches SW3 and SW4 become conducting, and switches SW1, SW2, SW5, and SW6 become nonconducting, so that ac voltage VAC1 received from the commercial ac power supply is supplied to load 11 through switches SW3 and SW4.

Figure 3:
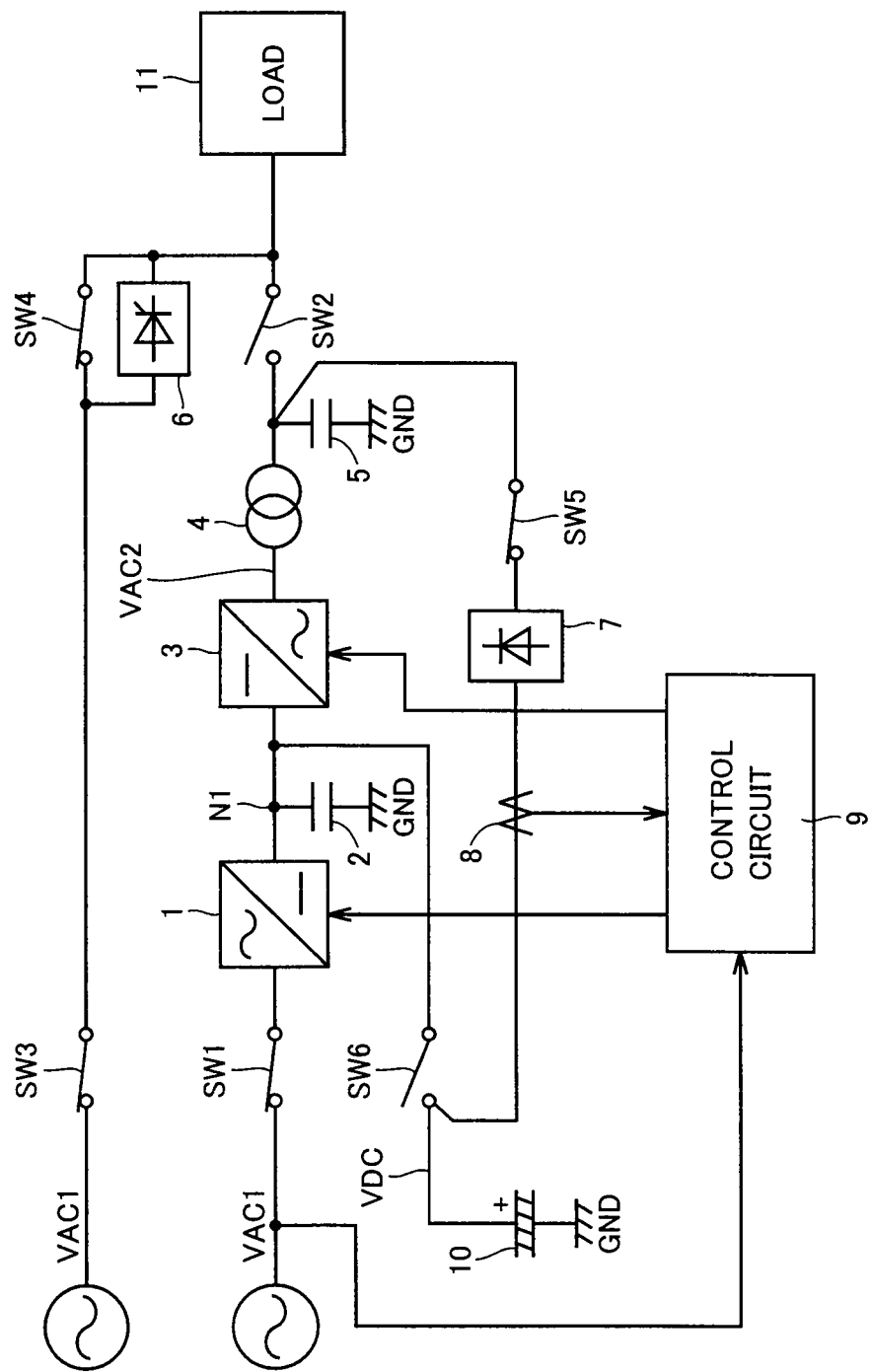
FIG. 3 is a circuit block diagram showing an EDLC precharge mode of the uninterruptible power supply device shown in FIG. 1.

When the uninterruptible power supply device is powered on at a certain time t0, switch SW1 becomes conducting at a time t1, and converter 1 is activated at a time t2. Then, at a time t3, inverter 3 is activated, and switch SW5 becomes conducting, so that the EDLC precharge mode is started as shown in FIG. 3. To prevent magnetic deviation of transformer 4, inverter 3 is controlled such that output voltage VAC2 increases gradually. Output voltage VAC2 of inverter 3 is supplied to rectifier circuit 7 through transformer 4 and switch SW5. Rectifier circuit 7 rectifies output voltage VAC2 of inverter 3 for supply to electric double-layer capacitor 10. Thus, a voltage VDC across terminals of electric double-layer capacitor 10 also increases gradually.

At this stage, control circuit 9 temporarily stops the increase in output voltage VAC2 of inverter 3 when the output current from rectifier circuit 7 detected by current detection circuit 8 exceeds a threshold current. Control circuit 9 increases output voltage VAC2 of inverter 3 again when the output current from rectifier circuit 7 falls below the threshold current.

Figure 4:
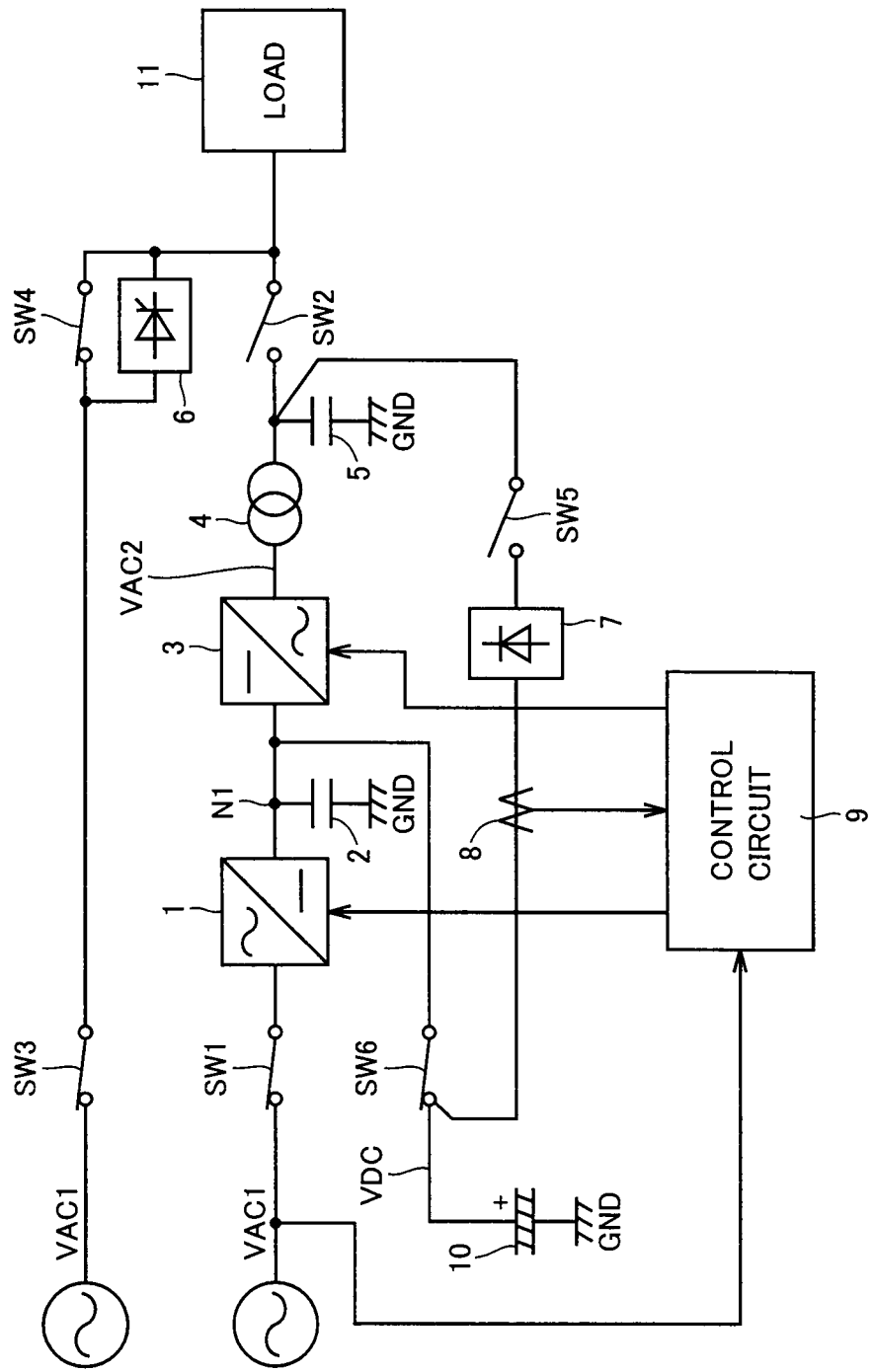
FIG. 4 is a circuit block diagram showing an EDLC charge mode of the uninterruptible power supply device shown in FIG. 1.

Then, at a time t4, when output voltage VAC2 of inverter 3 reaches a predetermined voltage and voltage VDC across the terminals of electric double-layer capacitor 10 reaches a predetermined voltage, switch SW5 becomes nonconducting, and switch SW6 becomes conducting, so that the EDLC charge mode is started as shown in FIG. 4. The output voltage of converter 1 is supplied to electric double-layer capacitor 10 through switch SW6, so that electric double-layer capacitor 10 is charged.

Then, in FIG. 4, switch SW2 becomes conducting, and output voltage VAC2 of inverter 3 is supplied to load 11 through transformer 4 and switch SW2. Since switches SW3 and SW4 are also conducting at this time, voltage VAC1 received from the commercial ac power supply and output voltage VAC2 of inverter 3 are both supplied to load 11.

Figure 5:
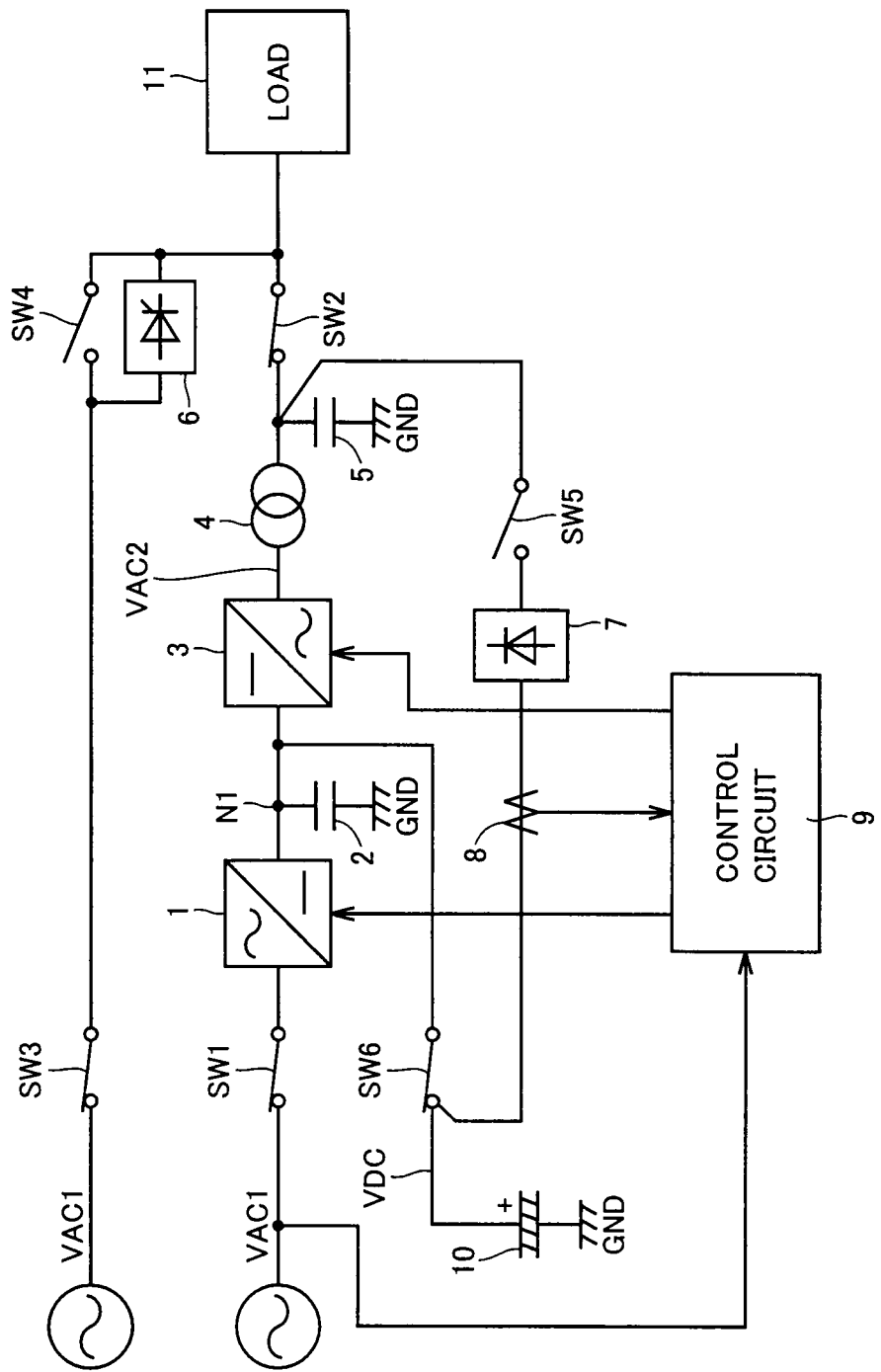
FIG. 5 is a circuit block diagram showing an inverter feed mode of the uninterruptible power supply device shown in FIG. 1.

Then, as shown in FIG. 5, switch SW4 becomes nonconducting to bring about an inverter feed mode. In the inverter feed mode, during a normal operation in which ac voltage VAC1 is supplied from the commercial ac power supply, converter 1 converts the ac power received from the commercial ac power supply into dc power for supply to inverter 3 and electric double-layer capacitor 10. During a power interruption in which the supply of ac voltage VAC1 received from the commercial ac power supply is stopped, converter 1 stops driving, and the dc power stored in electric double-layer capacitor 10 is supplied to inverter 3. Inverter 3 converts the dc power into ac power for supply to load 11. Therefore, even during a power interruption, ac power can be supplied to load 11 to drive load 11. When the power interruption time is short, the inverter feed mode shown in FIG. 5 is continued, and when the power interruption time is long, the operation returns to the bypass feed mode shown in FIG. 1 since electric double-layer capacitor 10 needs to be precharged.

Figure 6:
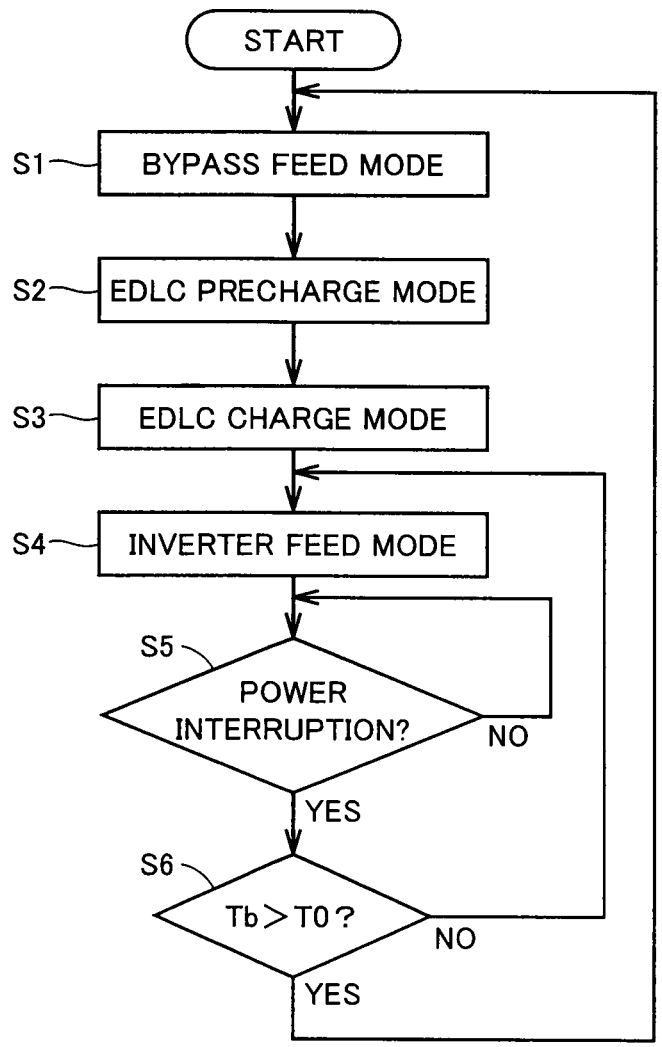
FIG. 6 is a flow chart showing an operation of the uninterruptible power supply device shown in FIG. 1.

FIG. 6 is a flow chart showing an operation of this uninterruptible power supply device. In FIG. 6, upon power-on, control circuit 9 executes the bypass feed mode at a step S1 to supply ac power received from the commercial ac power supply to load 11 through switches SW3 and SW4. At a step S2, control circuit 9 executes the EDLC precharge mode to cause switches SW1 and SW5 to become conducting and to gradually increase the output power of inverter 3. The output power of inverter 3 is thus rectified at rectifier circuit 7 to be converted into dc power, and voltage VDC across the terminals of electric double-layer capacitor 10 increases gradually.

At a step S3, control circuit 9 executes the EDLC charge mode to cause switch SW5 to become nonconducting and switch SW6 to become conducting, so that the output power of converter 1 is supplied to electric double-layer capacitor 10 instead of the output power of rectifier circuit 7. At a step S4, control circuit 9 executes the inverter feed mode to cause switch SW4 to become nonconducting and switch SW2 to become conducting, so that the output power of inverter 3 is supplied to load 11 instead of the ac power received from the commercial ac power supply.

At a step S5, control circuit 9 determines whether or not a power interruption has occurred, and when a power interruption has occurred, determines at a step S6 whether or not a power interruption time Tb is longer than a predetermined time T0. When determined that power interruption time Tb is shorter than predetermined time T0, control circuit 9 returns the process to step S4 since electric double-layer capacitor 10 does not need to be precharged. When determined that power interruption time Tb is longer than predetermined time T0, control circuit 9 returns the process to step S1 since electric double-layer capacitor 10 needs to be precharged again.

It is noted that, during a power interruption, the dc power stored in electric double-layer capacitor 10 is supplied to inverter 3, so that the charge level of electric double-layer capacitor 10 decreases as power interruption time Tb is prolonged. Therefore, determining whether or not power interruption time Tb is longer than predetermined time T0 corresponds to determining whether or not the charge level of electric double-layer capacitor 10 is lower than a predetermined threshold level. As a method of determining whether or not the charge level of electric double-layer capacitor 10 is lower than the predetermined threshold level, there is also a method of determining whether or not voltage VDC across the terminals of electric double-layer capacitor 10 is lower than the predetermined threshold voltage.

Figure 7:
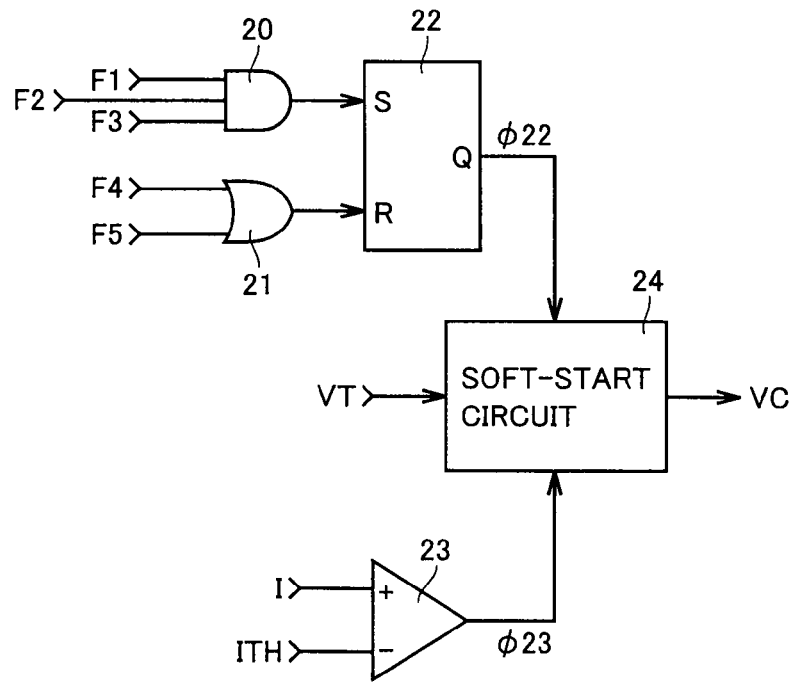
FIG. 7 is a circuit block diagram showing a portion related to soft-start of an inverter in a control circuit shown in FIG. 1.

FIG. 7 is a circuit block diagram showing a portion related to soft-start of inverter 3 in control circuit 9. In FIG. 7, control circuit 9 includes an AND gate 20, an OR gate 21, a flip-flop 22, a comparison circuit 23, and a soft-start circuit 24.

AND gate 20 supplies AND signals of signals F1 to F3 to a set terminal (S) of flip-flop 22. Signal F1 is a signal that is brought into the "H" level when switch SW1 becomes conducting. Signal F2 is a signal that is brought into the "H" level when execution of the inverter feed mode is instructed. Signal F3 is a signal that is brought into the "H" level when output voltage VAC2 of inverter 3 reaches a target voltage. If all signals F1 to F3 are brought into the "H" level, an output signal of AND gate 20 is raised to the "H" level to set flip-flop 22, so that an output signal φ22 of flip-flop 22 is brought into the "H" level. Thus, when output signal φ22 of flip-flop 22 is at the "H" level, precharge of electric double-layer capacitor 10 has been completed.

OR gate 21 supplies OR signals of signals F4 and F5 to a reset terminal (R) of flip-flop 22. Signal F4 is a signal that is brought into the "H" level when a serious failure occurs. Signal F5 is a signal that is brought into the "H" level when the uninterruptible power supply device is failed and reset. When at least one of signals F4 and F5 is brought into the "H" level, an output signal of OR gate 21 is raised to the "H" level to reset flip-flop 22, so that output signal φ22 of flip-flop 22 is brought into the "L" level. Thus, when output signal φ22 of flip-flop 22 is at the "L" level, electric double-layer capacitor 10 needs to be precharged.

Comparison circuit 23 compares an output current I of rectifier circuit 7 detected at current detection circuit 8 with a predetermined threshold current ITH to output a signal φ23 of a level in accordance with the comparison result. When output current I of rectifier circuit 7 is higher than threshold current ITH, signal φ23 is at the "H" level. When output current I of rectifier circuit 7 is lower than threshold current ITH, signal φ23 is at the "L" level. In accordance with signals φ22 and φ23, soft-start circuit 24 gradually increases an output voltage command value VC for inverter 3 from 0 to a target voltage command value VT. Output voltage VAC2 of inverter 3 increases gradually to a target voltage in accordance with output voltage command VC.

Figure 8:
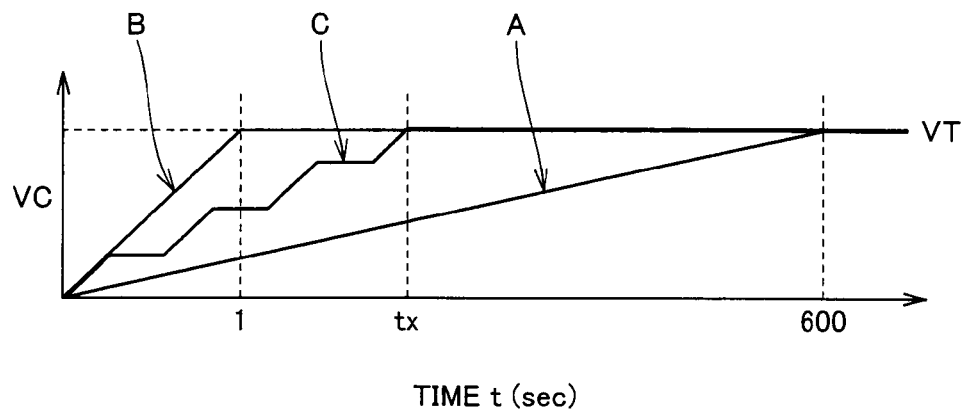
FIG. 8 is a timing chart showing an operation of a soft-start circuit shown in FIG. 7.

FIG. 8 is a timing chart illustrating an operation of soft-start circuit 24. A curve A in FIG. 8 represents a time variation of output voltage command value VC for inverter 3 in the case where signals φ22 and φ23 are both at the "L" level. In this case, since electric double-layer capacitor 10 needs to be precharged, soft-start circuit 24 gradually increases output voltage command value VC for inverter 3 from 0 to target voltage command value VT for 600 seconds, for example. Thus, voltage VDC across the terminals of electric double-layer capacitor 10 can be gradually increased from 0V to a predetermined voltage, which can prevent an overcurrent from flowing through rectifier circuit 7, while preventing magnetic deviation of transformer 4.

A curve B in FIG. 8 represents a time variation of output voltage command value VC for inverter 3 in the case where signals φ22 and φ23 are at the "H" level and the "L" level, respectively. In this case, electric charges remain at electric double-layer capacitor 10 since electric double-layer capacitor 10 has been precharged once. Then, soft-start circuit 24 increases output voltage command value VC for inverter 3 at a higher speed than in the case where signal φ22 is at the "L" level. That is, soft-start circuit 24 gradually increases output voltage command value VC for inverter 3 from 0 to target voltage command value VT for 1 second, for example. Thus, voltage VDC across the terminals of electric double-layer capacitor 10 can be increased to the predetermined voltage relatively rapidly.

A curve C in FIG. 8 represents a time variation of output voltage command value VC for inverter 3 in the case where signal φ23 changes from the "L" level to the "H" level several times (three times in FIG. 8) while signal φ22 is at the "H" level. In this case, electric charges remain at electric double-layer capacitor 10 since electric double-layer capacitor 10 has been precharged once. Then, soft-start circuit 24 increases output voltage command value VC for inverter 3 at a higher speed than in the case where signal φ22 is at the "L" level.

However, when output current I of rectifier circuit 7 exceeds threshold current ITH, soft-start circuit 24 temporarily stops increasing output voltage command value VC for inverter 3, and waits until output current I of rectifier circuit 7 falls below threshold current ITH. When output current I of rectifier circuit 7 falls below threshold current ITH, soft-start circuit 24 increases output voltage command value VC for inverter 3 again. In this case, output voltage command value VC for inverter 3 varies from 0 to target voltage command value VT for a time tx between 1 and 600 seconds. In this manner, by repeating the increase in output voltage command value VC for inverter 3 and the temporary stop of the increase, electric double-layer capacitor 10 can be charged rapidly, while preventing an overcurrent from flowing.

In this embodiment, electric double-layer capacitor 10 is precharged using the soft-start function of inverter 3 provided conventionally to prevent magnetic deviation of transformer 4. Therefore, electric double-layer capacitor 10 can be precharged easily with a simple configuration as compared to the case of providing a precharge circuit separately.

It should be understood that the embodiments disclosed herein are illustrative and non-restrictive in every respect. The scope of the present invention is defined by the claims, and is intended to include any modification within the meaning and scope equivalent to the terms of the claims.

Reference Signs List

SW1 to SW6 switch; 1 converter; 2, 5 capacitor, 3 inverter; 4 transformer; 6 STS (Static Transfer Switch); 7 rectifier circuit; 8 current detection circuit; 9 control circuit; 10 electric double-layer capacitor; 11 load; 20 AND gate; 21 OR gate; 22 flip-flop; 23 comparison circuit; 24 soft-start circuit

The invention claimed is:

1. An uninterruptible power supply device comprising:
    a converter that converts first ac power from a commercial ac power supply into first dc power;
    an electric double-layer capacitor that stores the first dc power;
    an inverter that converts the first dc power from said converter and said electric double-layer capacitor into second ac power;
    a rectifier circuit that converts said second ac power into second dc power; and
    a charging circuit that supplies output power of said rectifier circuit to said electric double-layer capacitor at a first startup of said inverter, and that selectively supplies output power of one of said converter and said rectifier circuit to said electric double-layer capacitor at second and subsequent startups of said inverter,
    wherein at the second and subsequent startups of said inverter, said charging circuit supplies the output power of said rectifier circuit to said electric double-layer capacitor in a first case when a charge level of said electric double-layer capacitor is lower than a predetermined threshold level, and supplies the output power of said converter to said electric double-layer capacitor in a second case when the charge level of said electric double-layer capacitor is higher than said predetermined threshold level.

2. The uninterruptible power supply device according to claim 1, wherein said charging circuit determines that the charge level of said electric double-layer capacitor is lower than said predetermined threshold level when a power interruption time of said commercial ac power supply is longer than a predetermined time, and determines that the charge level of said electric double-layer capacitor is higher than said predetermined threshold level when the power interruption time of said commercial ac power supply is shorter than said predetermined time.

3. The uninterruptible power supply device according to claim 1, wherein said charging circuit determines that the charge level of said electric double-layer capacitor is lower than said predetermined threshold level when a voltage across terminals of said electric double-layer capacitor is lower than a predetermined voltage, and determines that the charge level of said electric double-layer capacitor is higher than said predetermined threshold level when the voltage across the terminals of said electric double-layer capacitor is higher than said predetermined voltage.

4. The uninterruptible power supply device according to claim 1, further comprising a switch circuit that receives said first ac power and said second ac power to supply said second ac power to a load in response to termination of said first startup of said inverter, and where a power interruption of said commercial ac power supply occurs, said switch circuit supplies said first ac power to said load in said first case and supplies said second ac power to said load in said second case.

5. The uninterruptible power supply device according to claim 1, further comprising a soft-start circuit that increases an output voltage of said inverter to a target voltage at a first speed at said first startup of said inverter, and increases the output voltage of said inverter to the target voltage at a second speed faster than said first speed at said second and subsequent startups of said inverter.

6. The uninterruptible power supply device according to claim 5, further comprising a current detection circuit that detects an output current of said rectifier circuit, wherein
    said soft-start circuit increases the output voltage of said inverter at one of said first speed and said second speed when a detection value of said current detection circuit is lower than a predetermined threshold current, and temporarily stops increasing the output voltage of said inverter when the detection value of said current detection circuit is higher than said predetermined threshold current.

7. The uninterruptible power supply device according to claim 4, further comprising a transformer that receives said second ac power and outputs said second ac power to said switch circuit.

8. The uninterruptible power supply device according to claim 7, further comprising a capacitor connected to an output of said transformer to remove noise from said second ac power.

9. The uninterruptible power supply device according to claim 1, wherein an output of said inverter is connectable to an input of a load and connected to an input of said rectifier circuit.

10. The uninterruptible power supply device according to claim 1, wherein an output of the commercial ac power and an output of said inverter are connectable to an input of a load.

11. The uninterruptible power supply device according to claim 1, wherein an input of said double-layer capacitor is connected to an output of said rectifier circuit and an output of said converter.

12. The uninterruptible power supply device according to claim 1, wherein said electric double-layer capacitor is directly connected to an output of said converter and an input of said inverter.

13. A method for supplying uninterruptible power comprising:
    converting, using a converter, first ac power from a commercial ac power supply into first dc power;
    storing, in an electric double-layer capacitor, said first dc power;
    converting, using an inverter, said first dc power from said converter and said electric double-layer capacitor into second ac power;
    converting, using a rectifier circuit, said second ac power into second dc power; and
    supplying, using a charging circuit, output power of said rectifier circuit to said electric double-layer capacitor at a first startup of said inverter, and selectively supplying, using the charging circuit, output power of one of said converter and said rectifier circuit to said electric double-layer capacitor at second and subsequent startups of said inverter,
    wherein at the second and subsequent startups of said inverter, supplying the output power of said rectifier circuit to said electric double-layer capacitor in a first case when a charge level of said electric double-layer capacitor is lower than a predetermined threshold level, and supplying the output power of said converter to said electric double-layer capacitor in a second case when the charge level of said electric double-layer capacitor is higher than said predetermined threshold level.

14. The method for supplying uninterruptible power according to claim 13, wherein said electric double-layer capacitor is directly connected to an output of said converter and an input of said inverter.

* * * * *